United States Patent
Suzuki et al.

(10) Patent No.: US 7,931,940 B2
(45) Date of Patent: Apr. 26, 2011

(54) PRODUCTION METHOD OF SILICA AEROGEL FILM, ANTI-REFLECTION COATING AND OPTICAL ELEMENT

(75) Inventors: Mineta Suzuki, Saitama-ken (JP); Takanobu Shiokawa, Kanagawa-ken (JP); Kazuhiro Yamada, Saitama-ken (JP); Hiroyuki Nakayama, Tokyo (JP); Hideki Yamaguchi, Kyoto (JP); Ayako Maruta, Kyoto (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/199,097

(22) Filed: Aug. 27, 2008

(65) Prior Publication Data
US 2009/0087665 A1 Apr. 2, 2009

(30) Foreign Application Priority Data
Aug. 28, 2007 (JP) ................... 2007-221212

(51) Int. Cl.
*B05D 3/04* (2006.01)
(52) U.S. Cl. ....................... 427/344; 427/343
(58) Field of Classification Search ............ 427/387, 427/343, 344
See application file for complete search history.

(56) References Cited

U.S. PATENT DOCUMENTS

| | | | |
|---|---|---|---|
| 5,948,482 A | 9/1999 | Brinker et al. | |
| 6,764,543 B2 * | 7/2004 | Greenwood et al. | 106/737 |
| 2006/0154044 A1 * | 7/2006 | Yamada et al. | 428/312.2 |
| 2007/0207325 A1 * | 9/2007 | Brinley et al. | 428/432 |

FOREIGN PATENT DOCUMENTS
JP 08-337753 12/1996

OTHER PUBLICATIONS

Fan, B., "Scratch-Resistant Improvement of Sol-Gel Derived Nano-Porous Silica Films", Journal of Sol-Gel Science and Technology vol. 18, pp. 219-224, 2000.
English language Abstract of JP 08-337753, Dec. 1996.

* cited by examiner

*Primary Examiner* — Michael Barr
*Assistant Examiner* — Robert S Walters, Jr.
(74) *Attorney, Agent, or Firm* — Greenblum & Bernstein, P.L.C.

(57) ABSTRACT

A method for producing a silica aerogel film by hydrolyzing and polymerizing alkoxysilane in the presence of a base catalyst to prepare an alkaline sol, adding an acid catalyst to the alkaline sol to carry out further hydrolysis and polymerization to prepare a first acidic sol, hydrolyzing and polymerizing alkoxysilane in the presence of an acid catalyst to prepare a second acidic sol, applying a mixture of the first and second acidic sols to a substrate, and drying it.

6 Claims, 1 Drawing Sheet

PRODUCTION METHOD OF SILICA AEROGEL FILM, ANTI-REFLECTION COATING AND OPTICAL ELEMENT

FIELD OF THE INVENTION

The present invention relates to a method for producing a silica aerogel film having nanometer-sized fine pores and thus having a low refractive index and excellent scratch resistance, an anti-reflection coating formed by such silica aerogel, and an optical element having such anti-reflection coating.

BACKGROUND OF THE INVENTION

Anti-reflection coatings are formed by a physical vapor deposition method such as vacuum vapor deposition, sputtering, ion plating, etc., or a liquid-phase method such as a sol-gel method. The anti-reflection coatings should have smaller refractive indices than those of substrates, but even the smallest-refractive-index $MgF_2$ obtained by a physical vapor deposition method has as relatively large a refractive index as 1.38. This refractive index is larger than an ideal level (1.2-1.25) of anti-reflection coatings for glass or plastic lenses (refractive index: about 1.5-1.9). An anti-reflection coating having a refractive index of 1.2-1.25 exhibits reflectance of less than 1% in a visible-light region having a wavelength of 400-700 nm, while an anti-reflection coating made of $MgF_2$ having a refractive index of 1.38 has reflectance of more than 1%.

Silica aerogel obtained by the sol-gel method has a smaller refractive index than that of $MgF_2$. U.S. Pat. No. 5,948,482 discloses a method for producing aerogel usable for anti-reflection coatings, comprising the steps of preparing a colloidal sol, turning it to gel by aging, modifying a gel surface with a non-aqueous, organic group in a non-aqueous medium, turning the surface-modified gel to sol by a ultrasonic treatment in a non-aqueous medium, and applying the sol to a substrate. The resultant aerogel coating has porosity of up to 99% (low refractive index), but it is poor in scratch resistance.

"Journal of Sol-Gel Science and Technology," 2000, Vol. 18, pp. 219-224 proposes a method for producing a nanoporous silica coating having excellent scratch resistance comprising the steps of hydrolyzing and polymerizing tetraethoxysilane in the presence of ammonia in a mixed solvent of ethanol and water at 80° C. for 2-20 hours to prepare an alkaline sol, adding tetraethoxysilane, water and hydrochloric acid and aging the resultant mixture at 60° C. for 15 days, applying the formed sol to a substrate, drying it at 80° C. for 30 minutes, and heat-treating it in a mixed gas of ammonia and steam or in the atmosphere at 400° C. for 30 minutes. However, this method needs 15-day aging, meaning low efficiency, and the resultant nanoporous silica coating does not have sufficient scratch resistance.

OBJECT OF THE INVENTION

Accordingly, an object of the present invention is to provide a method for efficiently producing a silica aerogel film having a low refractive index and excellent scratch resistance, a anti-reflection coating formed by such silica aerogel film, and an optical element having such anti-reflection coating.

DISCLOSURE OF THE INVENTION

As a result of intense research in view of the above object, the inventors have found that a silica aerogel film having a low refractive index and excellent scratch resistance can efficiently be produced by mixing a first acidic sol obtained by hydrolyzing and polymerizing alkoxysilane successively in the presence of a base catalyst and an acid catalyst, with a second acidic sol obtained by hydrolyzing and polymerizing alkoxysilane in the presence of an acid catalyst. The present invention has been completed based on such finding.

Thus, the method of the present invention for producing a silica aerogel film comprises the steps of hydrolyzing and polymerizing alkoxysilane in the presence of a base catalyst to prepare an alkaline sol, adding an acid catalyst to the alkaline sol to carry out further hydrolysis and polymerization to prepare a first acidic sol, hydrolyzing and polymerizing alkoxysilane in the presence of an acid catalyst to prepare a second acidic sol, mixing said first and second acidic sols, applying the resultant mixed sol to a substrate, and drying it.

The alkoxysilane for the first acidic sol is preferably a monomer or oligomer of tetraalkoxysilane. The alkoxysilane for the second acidic sol is preferably at least one selected from the group consisting of methyltrialkoxysilane, tetraalkoxysilane and their oligomers. The base catalyst for the first acidic sol is preferably ammonia. The organic solvent for the first acidic sol is preferably methanol. The organic solvent for the second acidic sol is preferably methanol and/or ethanol.

Said alkaline sol is preferably prepared from a mixture of alkoxysilane, alcohol, water and a base catalyst. Said second acidic sol is preferably prepared from a mixture of alkoxysilane, alcohol, water and an acid catalyst.

To obtain excellent scratch resistance, the mass ratio of the first acidic sol to the second acidic sol in the mixed sol is preferably 5-90 on a solid basis. The average particle size ratio of silica particles in said first acidic sol to silica particles in said second acidic sol in the mixed sol is preferably 5-50.

The anti-reflection coating of the present invention is formed by a silica aerogel film produced by the above method.

The optical element of the present invention has the above anti-reflection coating on a surface of an optical substrate.

DESCRIPTION OF THE PREFERRED EMBODIMENTS

Figure 1:
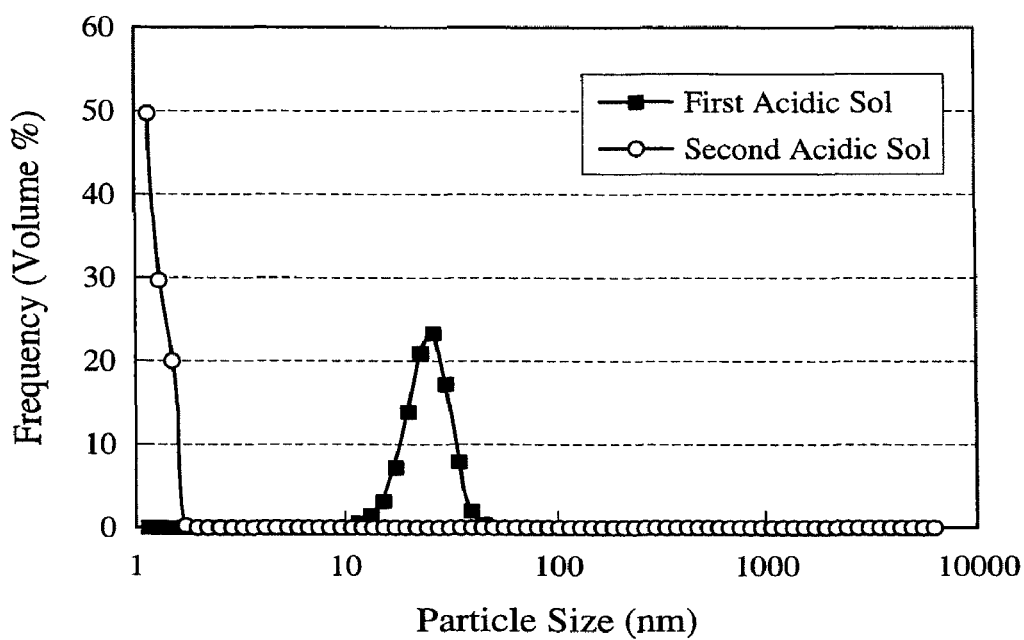
FIG. 1 is a graph showing the particle size distribution of silica particles in the first and second acidic sols of Example 1.

The method of the present invention for producing a silica aerogel film comprises the steps of (1) preparing a first acidic sol by hydrolyzing and polymerizing alkoxysilane in the presence of a base catalyst, and then adding an acid catalyst to the resultant alkaline sol for further hydrolysis and polymerization, (2) preparing a second acidic sol by hydrolyzing and polymerizing alkoxysilane in the presence of an acid catalyst, (3) mixing said first and second acidic sols, (4) applying the resultant mixed sol to a substrate, and (5) drying it.

[1] First acidic sol (1) Preparation of alkaline sol (a) Alkoxysilane

The alkoxysilane for the first acidic sol is preferably a monomer or oligomer (polycondensate) of tetraalkoxysilane. Tetrafunctional alkoxysilane can advantageously form a sol containing colloidal silica particles having a relatively large average particle size. The tetraalkoxysilane is represented by $Si(OR)_4$, wherein R is preferably an alkyl group having 1-5 carbon atoms (methyl, ethyl, propyl, butyl, etc.), or an acyl group having 1-4 carbon atoms (acetyl, etc.). Specific examples of the tetraalkoxysilanes include tetramethoxysilane, tetraethoxysilane, tetrapropoxysilane, tetrabutoxysilane, diethoxydimethoxysilane, etc. Among them, tetramethoxysilane and tetraethoxysilane are preferable. The tetraalkoxysilane may contain alkoxysilane having three or less functional groups in such a small amount as not hindering the effect of the present invention.

(b) Hydrolysis and polymerization in the presence of base catalyst

The alkoxysilane is mixed with an organic solvent, a base catalyst and water. The organic solvent s are preferably alcohols such as methanol, ethanol, n-propanol, i-propanol, butanol, etc., more preferably methanol and ethanol. The base catalysts are preferably ammonia, amines, NaOH and KOH. The preferred amines are alcohol amines and alkyl amines (methylamine, dimethylamine, trimethylamine, n-butylamine, n-propylamine, etc.).

The molar ratio of the organic solvent to the alkoxysilane is preferably 3-100. When the organic solvent/alkoxysilane molar ratio is less than 3, silica particles in the resultant sol have too large particle sizes. When the molar ratio is more than 100, silica particles in the resultant sol have too small particle sizes. The base catalyst/alkoxysilane molar ratio is preferably from $1 \times 10^{-2}$ to 1, more preferably from $1 \times 10^{-2}$ to 0.8, most preferably from $3 \times 10^{-2}$ to 0.5. When the base catalyst/alkoxysilane molar ratio is less than $1 \times 10^{-2}$, the hydrolysis reaction of alkoxysilane does not occur sufficiently. When the molar ratio exceeds 1, catalytic effects are saturated. The water/alkoxysilane molar ratio is preferably 1-30. When the water/alkoxysilane molar ratio is more than 30, the hydrolysis reaction proceeds too fast. When the molar ratio is less than 1, the hydrolysis of alkoxysilane does not occur sufficiently.

A solution of alkoxysilane containing the base catalyst and water is preferably left to stand or slowly stirred for aging at 10-90° C. for about 10-60 hours. The aging causes the hydrolysis and polymerization to proceed to form a silica sol. The silica sol includes a dispersion of colloidal silica particles, which may be aggregated in a cluster.

(2) Hydrolysis and polymerization in the presence of acid catalyst

The resultant alkaline sol is mixed with an acid catalyst, and if necessary water and an organic solvent, to cause hydrolysis and polymerization. The acid catalyst may be hydrochloric acid, nitric acid, sulfuric acid, phosphoric acid and acetic acid. The organic solvent may be the same as described above. The molar ratio of the acid catalyst to the base catalyst in the resultant first acidic sol is preferably 1.1-10, more preferably 1.5-5, most preferably 2-4. When the acid catalyst/base catalyst molar ratio is less than 1.1, the polymerization in the presence of the acid catalyst does not proceed sufficiently. When the molar ratio exceeds 10, catalytic effects are saturated. The organic solvent/alkoxysilane molar ratio and the water/alkoxysilane molar ratio may be the same as described above. The sol containing the acid catalyst is preferably left to stand or slowly stirred at 10-90° C. for about 15 minutes to 24 hours for aging. The aging causes the hydrolysis and polymerization to proceed to form a first acidic sol.

(3) Average particle size

The average particle size of silica particles in the first acidic sol is 100 nm or less, preferably 10-50 nm. The average particle size is measured by a dynamic light scattering method.

[2] Second acidic sol (1) Alkoxysilane

The alkoxysilane for the second acidic sol may have 2 to 4 functional groups, represented by $Si(OR^1)_x(R^2)_{4-x}$, wherein x is an integer of 2-4. $R^1$ is preferably an alkyl group having 1-5 carbon atoms, which may be the same as described above, or an acyl group having 1-4 carbon atoms. $R^2$ is preferably an organic group having 1-10 carbon atoms; for instance, hydrocarbon groups such as methyl, ethyl, propyl, butyl, hexyl, cyclohexyl, octyl, decyl, phenyl, vinyl, allyl, etc., and substituted hydrocarbon groups such as γ-chloropropyl, $CF_3CH_2-$, $CF_3CH_2CH_2-$, $C_2F_5CH_2CH_2-$, $C_3F_7CH_2CH_2CH_2-$, $CF_3OCH_2CH_2CH_2-$, $C_2F_5OCH_2CH_2CH_2-$, $C_3F_7OCH_2CH_2CH_2-$, $(CF_3)_2CHOCH_2CH_2CH_2-$, $C_4F_9CH_2OCH_2CH_2CH_2-$, 3-(perfluorocyclohexyloxy)propyl, $H(CF_2)_4CH_2OCH_2CH_2CH_2-$, $H(CF_2)_4CH_2CH_2CH_2-$, γ-glycidoxypropyl, γ-mercaptopropyl, 3,4-epoxycyclohexylethyl, γ-methacryloyloxypropyl, etc.

Specific examples of bifunctional alkoxysilanes include dimethyldialkoxysilane such as dimethyldimethoxysilane, dimethyldiethoxysilane, etc. Specific examples of trifunctional alkoxysilanes include methyltrialkoxysilane such as methyltrimethoxysilane, methyltriethoxysilane, etc., and phenyltrialkoxysilane such as phenyltriethoxysilane, etc. The tetrafinctional alkoxysilanes may be the same as described above. The alkoxysilane preferably has 3 or more functional groups, and is more preferably methyltrialkoxysilane and tetraalkoxysilane.

(2) Hydrolysis and polymerization in the presence of acid catalyst

A monomer or oligomer (polycondensate) of the alkoxysilane is mixed with an organic solvent, an acid catalyst and water. The organic solvent and the acid catalyst may be the same as described above. The acid catalyst/alkoxysilane molar ratio is preferably from $1 \times 10^{-4}$ to 1, more preferably from $1 \times 10^{-4}$ to $3 \times 10^{-2}$, most preferably from $3 \times 10^{-4}$ to $1 \times 10^{-2}$. The organic solvent/alkoxysilane molar ratio and the water/alkoxysilane molar ratio may be the same as described above.

A solution of alkoxysilane containing the acid catalyst and water is preferably left to stand or slowly stirred at 10-90° C. for about 30 minutes to 60 hours for aging. The aging causes the hydrolysis and polymerization to proceed to form a second acidic sol. When the aging time exceeds 60 hours, silica particles in the sol have too large average particle size.

Colloidal silica particles in the second acidic sol have relatively small average particle sizes. Specifically, colloidal silica particles in the second acidic sol have an average particle size of 10 nm or less, preferably 1-5 nm. The average particle size ratio of silica particles in said first acidic sol to silica particles in said second acidic sol is preferably 5-50, more preferably 5-35. When the average particle size ratio is less than 5 or more than 50, the resultant silica aerogel film has low scratch resistance.

[3] Preparation of mixed sol

The first and second acidic sols are mixed, and preferably slowly stirred at 1-30° C. for about 1 minute to 6 hours. The mixture may be heated to a temperature of 80° C. or lower, if necessary. The mass ratio of the first acidic sol to the second acidic sol is preferably 5-90, more preferably 5-80, on a solid basis. When the mass ratio on a solid basis is less than 5 or more than 90, the resultant silica aerogel film has low scratch resistance.

[4] Formation of silica aerogel film (1) Coating

To adjust the concentration and fluidity of the mixed sol, the above organic solvent may be added as a dispersant. The concentration of silica in the mixed sol is preferably 0.1-20% by mass. If necessary, the mixed sol may be subjected to an ultrasonic treatment to prevent the aggregation of colloidal particles. The ultrasonic sound preferably has a frequency of 10-30 kHz and power of 300-900 W, and the treatment time is preferably 5-120 minutes.

The mixed sol can be applied to a substrate surface by a dip-coating method, a spray-coating method, a spin-coating method, a printing method, etc. When a three-dimensional item such as a lens is coated, the dipping method is preferable. A lifting speed in the dipping method is preferably about 0.1-3.0 mm/second.

(2) Drying

The drying conditions of a coating may be properly selected depending on the heat resistance of a substrate. To accelerate the polycondensation reaction, the coating may be heat-treated at a temperature lower than the boiling point of water for 15 minutes to 24 hours, and then at a temperature from 100° C. to 200° C. for 15 minutes to 24 hours. The heat-treated silica aerogel film has high scratch resistance.

[5] Silica aerogel film

The silica aerogel film is a porous film having a skeleton having Si—O bonds, which is highly transparent because of nanometer-sized, uniform, fine pores. The refractive index of the silica aerogel film becomes smaller as its porosity increases. To have a refractive index of 1.05-1.35, the silica aerogel film has a porosity of 30-90%. For instance, a silica aerogel film having a porosity of 78% has a refractive index of about 1.1. When the porosity is more than 90%, the silica aerogel film has too low scratch resistance. When the porosity is less than 30%, the refractive index is too large.

The silica aerogel film produced by the method of the present invention has a structure in which relatively small silica particles formed from the second acidic sol exist in gaps among relatively large silica particles formed from the first acidic sol, thereby having excellent scratch resistance despite a low refractive index.

[6] Anti-reflection coating

The physical thickness of the above silica aerogel film as an anti-reflection coating is preferably 15-500 nm, more preferably 70-170 nm. The thickness of the anti-reflection coating can properly be adjusted by the concentration of the mixed sol, the number of coating operations, etc.

[7] Optical element

The optical element of the present invention has an anti-reflection coating, which is the above silica aerogel film formed on an optical substrate, such as a lens, a prism, a light guide, a diffraction grating, etc. Materials for the optical substrate may be optical glass such as BK7, LASF01, LASF016, LaFK55, LAK14, SF5 and quartz glass, and plastics such as acrylic resins, polycarbonates, cyclic polyolefins and amorphous polyolefins. These substrates have refractive indices of about 1.5-1.9.

The present invention will be explained in more detail referring to Examples below without intention of restricting the present invention thereto.

Example 1

(1) Preparation of First Acidic Sol (a) Hydrolysis and polymerization in the presence of base catalyst 17.05 g of tetraethoxysilane was mixed with 69.13 g of methanol and then with 3.88 g of a 3-N aqueous ammonia solution, and stirred at room temperature for 15 hours to prepare an alkaline sol.

(b) Hydrolysis and polymerization in the presence of acid catalyst 40.01 g of the alkaline sol was mixed with 2.50 g of methanol and 1.71 g of 12-N hydrochloric acid, and stirred at room temperature for 30 minutes to prepare a first acidic sol (solid content: 4.94% by mass).

(2) Preparation of Second Acidic Sol

After 30 ml of tetraethoxysilane was mixed with 30 ml of ethanol and 2.4 ml of water at room temperature, 0.1 ml of 1-N hydrochloric acid was added. The resultant mixture was stirred at 60° C. for 90 minutes to prepare a second acidic sol (solid content: 14.8% by mass).

(3) Measurement of Average Particle Size

Using a dynamic-light-scattering particle size analyzer LB-550 available from Horiba, Ltd., the first and second acidic sols were measured with respect to the average particle sizes of silica particles. The results are shown in FIG. 1. Silica particles in the first acidic sol had a particle size distribution almost in a range of 10-50 nm, and an average particle size of 22.7 nm. Silica particles in the second acidic sol had a particle size distribution in a range of 2 nm or less, and an average particle size of 1.1 nm.

(4) Preparation of Mixed Sol 0.22 g of the second acidic sol was added to the total amount of the first acidic sol, such that the mass ratio of the first acidic sol to the second acidic sol was 67.1 on a solid basis, and stirred at room temperature for 5 minutes to prepare a mixed sol.

(5) Formation of Silica Aerogel Film

A silicon wafer was dip-coated with the mixed sol, heated at 80° C. for 30 minutes, and further heated at 160° C. for 30 minutes to form a silica aerogel film. Measurement using a reflectance meter (USPM-RU, available from Olympus Corporation) revealed that the silica aerogel film had a physical thickness of 146 nm and a refractive index of 1.24.

Example 2

A silica aerogel film was formed in the same manner as in Example 1, except that a flat BK7 glass plate (refractive index 1.52) was dip-coated with the mixed sol. The silica aerogel film had a physical thickness of 144 nm and a refractive index of 1.26.

Example 3

A silica aerogel film was formed in the same manner as in Example 2, except that the formulation of the alkaline sol had 17.05 g of tetraethoxysilane, 69.91 g of methanol and 3.10 g of an aqueous ammonia solution. The silica aerogel film had a physical thickness of 140 nm and a refractive index of 1.27.

Example 4

A silica aerogel film was formed in the same manner as in Example 2, except that the formulation of the alkaline sol had 17.05 g of tetraethoxysilane, 68.35 g of methanol and 4.66 g of an aqueous ammonia solution. The silica aerogel film had a physical thickness of 152 nm and a refractive index of 1.25.

Example 5

A silica aerogel film was formed in the same manner as in Example 2, except that 2.22 g of the second acidic sol was added to the total amount of the first acidic sol such that the mass ratio of the first acidic sol to the second acidic sol was 6.7 on a solid basis. The silica aerogel film had a physical thickness of 116 nm and a refractive index of 1.28.

Comparative Example 1

A silica aerogel film was formed in the same manner as in Example 2 except for using only the alkaline sol. The silica aerogel film had a physical thickness of 124 nm and a refractive index of 1.25.

Each silica aerogel film of Examples 1-5 and Comparative Example 1 was rubbed with a non-woven fabric (SPICK lens cleaning wiper, available from Ozu Corporation) 10 times at a pressure of 1 kgf/cm$^2$ and a speed of 120 times/minute. The rubbed surface of the silica aerogel film was observed to evaluate scratch resistance according to the following standards. The results are shown in Table 1.

Excellent: The silica aerogel film was not damaged at all.

Good: The silica aerogel film was slightly damaged, but not peeled.

Poor: The silica aerogel film peeled.

TABLE 1

| No. | Example 1 | Example 2 | Example 3 |
|---|---|---|---|
| Formation of Silica Aerogel Film | | | |
| Alkaline Sol | | | |
| TEOS[1] (g) | 17.05 | 17.05 | 17.05 |
| Methanol (g) | 69.13 | 69.13 | 69.91 |
| Aqueous NH$_3$ Solution[2] (g) | 3.88 | 3.88 | 3.10 |
| Hydrolysis | RT[3]/15 hrs | RT/15 hrs | RT/15 hrs |
| First Acidic Sol | | | |
| Alkaline Sol (g) | 40.01 | 40.01 | 40.01 |
| Methanol (g) | 2.50 | 2.50 | 2.50 |
| Hydrochloric Acid[4] (g) | 1.71 | 1.71 | 1.71 |
| Hydrolysis | RT/30 min | RT/30 min | RT/30 min |
| Average Particle Size (nm) | 22.7 | 22.7 | 20.8 |
| Second Acidic Sol | | | |
| TEOS (ml) | 30 | 30 | 30 |
| Ethanol (ml) | 30 | 30 | 30 |
| Water (ml) | 2.4 | 2.4 | 2.4 |
| Hydrochloric Acid[5] (ml) | 0.1 | 0.1 | 0.1 |
| Hydrolysis | 60° C./90 min | 60° C./90 min | 60° C./90 min |
| Average Particle Size (nm) | 1.1 | 1.1 | 1.1 |
| Mixed Sol | | | |
| First Acidic Sol (g) | 44.22 | 44.22 | 44.22 |
| Second Acidic Sol (g) | 0.22 | 0.22 | 0.22 |
| Mass Ratio[6] | 67.1 | 67.1 | 67.1 |
| Average Particle Size Ratio[7] | 20.6 | 20.6 | 18.9 |
| Coating Conditions | | | |
| Substrate | Si Wafer | BK7 | BK7 |
| Method | Dip-Coating | Dip-Coating | Dip-Coating |
| Drying Conditions | 80° C./30 min + 160° C./30 min | 80° C./30 min + 160° C./30 min | 80° C./30 min + 160° C./30 min |
| Properties of Silica Aerogel Film | | | |
| Physical Thickness (nm) | 146 | 144 | 140 |
| Refractive Index | 1.24 | 1.26 | 1.27 |
| Scratch Resistance | Good | Good | Good |

| No. | Example 4 | Example 5 | Comp. Ex. 1 |
|---|---|---|---|
| Formation of Silica Aerogel Film | | | |
| Alkaline Sol | | | |
| TEOS[1] (g) | 17.05 | 17.05 | 17.05 |
| Methanol (g) | 68.35 | 69.13 | 69.13 |
| Aqueous NH$_3$ Solution[2] (g) | 4.66 | 3.88 | 3.88 |
| Hydrolysis | RT/15 hrs | RT/15 hrs | RT/15 hrs |

TABLE 1-continued

| First Acidic Sol | | | |
|---|---|---|---|
| Alkaline Sol (g) | 40.01 | 40.01 | — |
| Methanol (g) | 2.50 | 2.50 | — |
| Hydrochloric Acid[(4)] (g) | 1.71 | 1.71 | — |
| Hydrolysis | RT/30 min | RT/30 min | — |
| Average Particle Size (nm) | 23.5 | 22.7 | — |
| Second Acidic Sol | | | |
| TEOS (ml) | 30 | 30 | — |
| Ethanol (ml) | 30 | 30 | — |
| Water (ml) | 2.4 | 2.4 | — |
| Hydrochloric Acid[(5)] (ml) | 0.1 | 0.1 | — |
| Hydrolysis | 60° C./90 min | 60° C./90 min | — |
| Average Particle Size (nm) | 1.1 | 1.1 | — |
| Mixed Sol | | | |
| First Acidic Sol (g) | 44.22 | 44.22 | — |
| Second Acidic Sol (g) | 0.22 | 2.22 | — |
| Mass Ratio[(6)] | 67.1 | 6.7 | — |
| Average Particle Size Ratio[(7)] | 21.4 | 20.6 | — |
| Coating Conditions | | | |
| Substrate | BK7 | BK7 | BK7 |
| Method | Dip-Coating | Dip-Coating | Dip-Coating |
| Drying Conditions | 80° C./30 min + 160° C./30 min | 80° C./30 min + 160° C./30 min | 80° C./30 min + 160° C./30 min |
| Properties of Silica Aerogel Film | | | |
| Physical Thickness (nm) | 152 | 116 | 124 |
| Refractive Index | 1.25 | 1.28 | 1.25 |
| Scratch Resistance | Good | Excellent | Poor |

Note:
[(1)]TEOS represents tetraethoxysilane.
[(2)]3 N.
[(3)]RT represents room temperature.
[(4)]12 N.
[(5)]1 N.
[(6)]The mass ratio of the first acidic sol to the second acidic sol on a solid basis.
[(7)]The average particle size ratio of silica particles in said first acidic sol to silica particles in said second acidic sol.

As is clear from Table 1, the silica aerogel films of Examples 1-5 had low refractive index and excellent scratch resistance. On the contrary, the silica aerogel film of Comparative Example 1 had poor scratch resistance, because it did not contain relatively small silica particles formed from the second acidic sol.

EFFECT OF THE INVENTION

A silica aerogel film produced by the method of the present invention using a mixed sol comprising a first acidic sol obtained by hydrolyzing and polymerizing alkoxysilane successively in the presence of a base catalyst and an acid catalyst, and a second acidic sol obtained by hydrolyzing and polymerizing alkoxysilane in the presence of an acid catalyst has a low refractive index and excellent scratch resistance.

The present disclosure relates to subject matter contained in Japanese Patent Application No. 2007-221212 filed on Aug. 28, 2007, which is expressly incorporated herein by reference in its entirety.

What is claimed is:

1. A method for producing a silica aerogel film comprising the steps of hydrolyzing and polymerizing alkoxysilane in the presence of a base catalyst to prepare an alkaline sol, adding an acid catalyst to the alkaline sol to carry out further hydrolysis and polymerization to prepare a first acidic sol, hydrolyzing and polymerizing alkoxysilane in the presence of an acid catalyst to prepare a second acidic sol, mixing said first and second acidic sols, applying the resultant mixed sol to a substrate, and drying it; wherein an average particle size ratio of silica particles in said first acidic sol to silica particles in said second acidic sol in said mixed sol is 18.9-21.4.

2. The method for producing a silica aerogel film according to claim 1, wherein alkoxysilane for said first acidic sol is a monomer or oligomer of tetraalkoxysilane.

3. The method for producing a silica aerogel film according to claim 1, wherein alkoxysilane for said second acidic sol is at least one selected from the group consisting of methyltrialkoxysilane, tetraalkoxysilane and their oligomers.

4. The method for producing a silica aerogel film according to claim 1, wherein said alkaline sol is prepared from a mixture of alkoxysilane, alcohol, water and a base catalyst.

5. The method for producing a silica aerogel film according to claim 1, wherein said second acidic sol is prepared from a mixture of alkoxysilane, alcohol, water and an acid catalyst.

6. The method for producing a silica aerogel film according to claim 1, wherein the mass ratio of said first acidic sol to said second acidic sol in said mixed sol is 5-90 on a solid basis.

* * * * *